United States Patent [19]

Bartels

[11] Patent Number: 5,309,445
[45] Date of Patent: May 3, 1994

[54] DYNAMIC SELF-CHECKING SAFETY CIRCUIT MEANS

[75] Inventor: James I. Bartels, Hudson, Wis.

[73] Assignee: Honeywell Inc., Minneapolis, Minn.

[21] Appl. No.: 898,056

[22] Filed: Jun. 12, 1992

[51] Int. Cl.$^5$ ............................................. G06F 11/00
[52] U.S. Cl. .................. 371/164; 371/21.3; 371/27
[58] Field of Search ............ 371/16.1, 16.4, 20.4, 371/21.3, 22.2, 22.4, 27, 57.1, 57.2

[56] References Cited

U.S. PATENT DOCUMENTS

| | | | |
|---|---|---|---|
| 3,569,793 | 3/1971 | Pinckaers | 317/123 |
| 4,327,556 | 5/1982 | Zampini et al. | 62/153 |
| 4,422,067 | 12/1983 | Clark et al. | 340/598 |
| 4,726,024 | 2/1988 | Guziak et al. | 371/16 |
| 4,800,507 | 1/1989 | Brown | 364/484 |
| 4,955,806 | 9/1990 | Grunden et al. | 431/24 |
| 5,113,399 | 5/1992 | Woods et al. | 371/21.3 |

Primary Examiner—Vincent P. Canney
Attorney, Agent, or Firm—Robert B. Leonard; Kenneth J. Johnson

[57] ABSTRACT

A safety circuit for monitoring computer hardware that can create an unsafe condition if a failure occurs. The circuit includes a microprocessor, a keyword decoder, and a dynamic safety relay drive circuit. The microprocessor runs a set of internal tests which create a keyword made up of a series of bits. A particular series of bits indicates the desired operation of the microprocessor. On alternate generations of the keyword one bit in the series is inverted. The keyword decoder receives the keywords and output a "true" signal if the keyword indicates the desired operation of the microprocessor, and "false" signal if the keyword indicates otherwise. The output of the keyword decoder is transmitted to the dynamic safety relay drive circuit, and this signal will keep the circuit energized as long as its alternating. The position of the bit which is inverted is rotated through the keyword so that different bit paths through the keyword decoder may be tested.

14 Claims, 3 Drawing Sheets

| $b_0$ | $b_1$ | $b_2$ | $b_3$ | $b_4$ | $b_5$ | $b_6$ | $b_7$ |
|---|---|---|---|---|---|---|---|
| 1 | 0 | 1 | 0 | 1 | 1 | 1 | 0 |

*Fig.2a*

| 0 | 0 | 1 | 0 | 1 | 1 | 1 | 0 |
|---|---|---|---|---|---|---|---|

*Fig.2b*

| 1 | 0 | 1 | 0 | 1 | 1 | 1 | 0 |
|---|---|---|---|---|---|---|---|

*Fig.2c*

| 1 | 1 | 1 | 0 | 1 | 1 | 1 | 0 |
|---|---|---|---|---|---|---|---|

DYNAMIC SELF-CHECKING SAFETY CIRCUIT MEANS

FIELD OF THE INVENTION

This invention relates to proving the safe operation of electronics, particularly for detecting malfunctions in the computer hardware of a monitoring system.

BACKGROUND OF THE INVENTION

Many types of systems have been developed for monitoring computer hardware that can create an unsafe condition if a failure occurs. An example is a burner control system in a furnace that is operated under the direction of units that are generically referred to as flame safeguard systems. In these types of systems, it is essential that if a certain failure occurs, the fuel valve to a fuel burner will close. The failure of a flame safeguard control system to operate properly can lead to a situation in which a fuel valve is left open when no flame exists, and a fuel-burning chamber can be loaded with fuel. This fuel can then be accidentally ignited causing an explosion. Before the introduction of microcomputers and microprocessors, the existing technology taught a flame safeguard system which utilized safety circuits that check for proper operation at the beginning of each burner cycle. This is commonly known as safe start check.

The conventional electromechanical and electronic types of control systems, including flame safeguard control systems, have been displaced by electronic control systems of the digital type that utilize microprocessors or microcomputers as the heart of the condition responsive control circuit means. One example which employs a microprocessor is U.S. Pat. No. 4,422,067 issued to Clark et al. The Clark et al patent discloses a dynamic self-checking circuit which monitors the status of a dangerous condition, such as a burner in a furnace, and continually performs self-tests to detect any malfunctions in the microprocessor hardware. The circuit operates by having a microprocessor regularly output a sequence of logic bits which indicate the operational status of each component of the microprocessor. A decoder receives the sequence of logic bits and will output a high signal if all the bits in the sequence indicate a certain operational status of the microprocessor. Between each generation of a high signal, the microprocessor outputs a preset low signal. If the microprocessor is operating properly, an alternating signal is output from the decoder, and this signal keeps a switch to the fuel valve energized. If the microprocessor malfunctions, the signal will no longer be alternating and the switch will de-energize.

A disadvantage of the Clark et al system is that not all system errors will be detected. It is possible that a bit path in the decoder may malfunction so that it constantly outputs a particular signal regardless of the signal it receives from the microprocessor. If the signal output from the stuck bit path represents the desired operation of a particular function of the microprocessor, the actual failure of this microprocessor function will not be detected. This could create a hazardous situation.

Because of the inherent danger in technologies such as burner controls, it is important that the safety control systems be reliable. However, the system should not be overly complicated or expensive in achieving this goal.

SUMMARY OF THE INVENTION

According to the invention there is provided an apparatus for providing reliable operation of a dynamic self-checking safety circuit means where the circuit includes a microprocessor. In operation, the microprocessor outputs a sequence of logic bits, also known as a keyword, in which each logic bit represents the status of an internal function of the microprocessor. The keyword is generated repetitively and at a particular frequency, and is output to a keyword decoder. On alternate generations of the keyword, one position in the keyword is chosen and the logic bit in that position is inverted. For example, if the position chosen in the keyword contained a "3" logic bit, it would be inverted to "0". When all the logic bits in the sequence are representative of the desired operation of the microprocessor, a first unique signal is output by the keyword decoder. When the keyword contains a logic bit which does not indicate the normal operation of the electronic circuit, or a bit which has been inverted, a second unique signal is output. If the microprocessor is operating normally, the keyword decoder will output a signal which alternates regularly between the first and second unique signals. The output of the keyword decoder is received by both a dynamic safety relay drive circuit and the microprocessor. The dynamic safety relay drive circuit controls electric power to the critical load by holding a switch closed only as long as it receives a signal in the form of a square wave from the keyword decoder.

The position of the inverted logic bit in the keyword is rotated through the keyword on a regular basis. This enables the system to send the inverted logic bit through different bit paths in the keyword decoder in order to check for malfunctions.

BRIEF DESCRIPTION OF THE DRAWINGS

FIG. 2 consisting of FIGS. 2a through 2d is an example of four consecutive keywords generated by the microprocessor of the microcomputer.

DESCRIPTION OF THE PREFERRED EMBODIMENT

The present invention relates to a safety monitoring system which uses a microprocessor. A likely application of this system is the monitoring of a fuel burner in a furnace or boiler. The microprocessor is used to program an ignition period, check for the presence of a pilot flame, and then check for the establishment of a main flame in the burner. In case of a microprocessor failure, a system must be established where the furnace or boiler is turned off and any open fuel valves are closed. The present invention discloses a monitoring system which will deactivate the fuel valve to a furnace or boiler when an error is detected in any part of the monitoring system. This invention has the capability to detect simultaneous errors which can occur throughout the monitoring system which were not detectable by the prior art.

Figure 1:
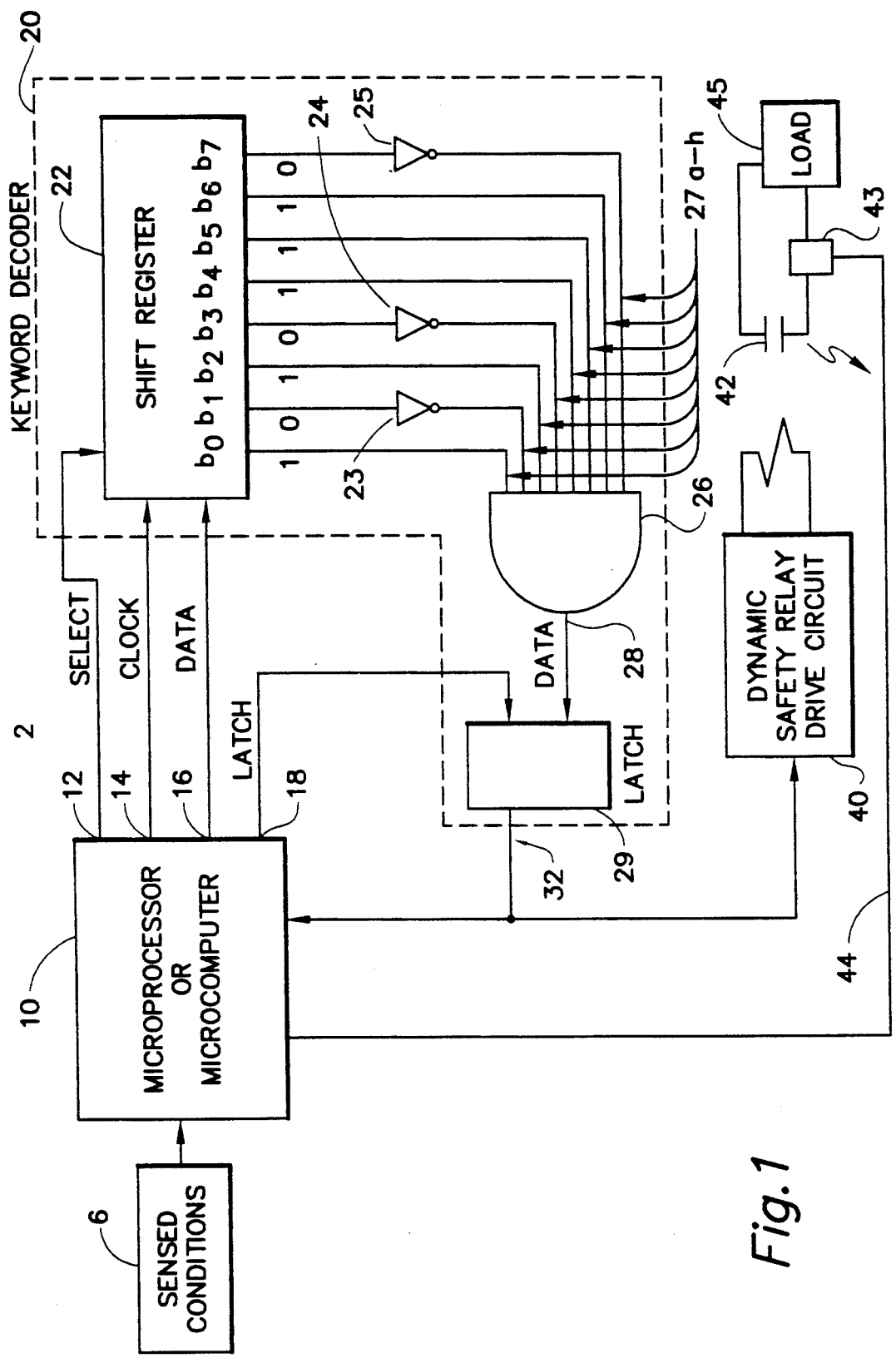
FIG. 1 is a schematic representation of the continuous checking means.

The dynamic self-checking safety circuit described herein is applicable to a wide range of computer systems. The embodiment illustrated in FIG. 1 shows a dynamic self-checking safety circuit 2 which includes a microprocessor 10, a keyword decoder 20, and a dynamic safety relay drive circuit 40. A microprocessor is used in the description of this invention, but a microcomputer would work equally as well. A possible microprocessor for use in this invention is the MCG8HC05 manufactured by Motorola. In one embodiment of this apparatus, the system is built around the microprocessor 10. The microprocessor controls the operation of a device such as furnace, and receives sensed conditions 6 in order to perform this task. The microprocessor 10, generates a predetermined sequence of logic bits, also known as keyword, which represents the operating status of particular internal functions of the microprocessor. These microprocessor functions may range from hardware checks for the read only memory (ROM), the random access memory (RAM), and the internal clock, to checks on software functions such as determining if a piece of software is present or determining if a piece of software has run. Another software test may be running a programmer counter test.

A single bit of the keyword may indicate the status of one microprocessor function, or it may indicate the status of many microprocessor functions. If each of the microprocessor functions is operating as desired, a logic bit in the keyword will be given either a "1" or a "0". Each function or set of functions is given a particular position within the keyword to indicate the result of its own internal test.

The microprocessor outputs a select signal 12, a data signal 14, and a clock signal 16. The keyword decoder 20 is activated when a select signal is received from the microprocessor 10. The keyword decoder 20 receives the logic bits of the keyword at intervals controlled by the clock signal 16 and each position in the shift register 22 is filled by a logic bit of the keyword. The keyword decoder can be implemented on an application specific integrated circuit (ASIC) which is manufactured by National Semiconductor. Each logic bit of the keyword is sent on bit paths 27a-h to AND gate 26. The AND gate 26 will output a signal over conductor 28 which is stored in latch 29. Upon receiving a timed input over conductor 18, the latch will output the signal received from the AND gate 26 over the conductor 32 to the microprocessor and the dynamic safety relay drive circuit 40.

The dynamic safety relay drive circuit 40 can be of the type disclosed in U.S. Pat. No. 3,569,793 issued to Pinkaers. Very generally, U.S. Pat. No. 3,569,793 discloses a fail-safe circuit which responds only to a cyclic input signal. In this fail safe circuit, there is a switch which controls current to a load. Normally the switch is left open, but if a coil in the fail-safe circuit becomes energized, the switch will close. This coil will only become energized if the fail-safe circuit receives a cyclic input that has a frequency which varies between a particular range. As seen in FIG. 1, the switch which the dynamic safety relay drive circuit 40 opens and closes is electrical contact 42.

In one embodiment of the invention, the load 45 is a fuel valve in a burner control system. As long as the furnace is operating normally, an oscillating signal in the form of a square wave is received by the dynamic safety relay drive circuit, and contact 42 is kept closed. When a dangerous condition or a hardware malfunction is detected, the signal to the dynamic safety relay drive circuit is either cut off or will no longer oscillate, and this will cause contact 42 to open and the fuel valve to shut down.

Electrical load contact 43 is put in series with contact 42. Load contact 43 is opened and closed in response to a signal sent over conductor 44 from the microprocessor 10. The microprocessor responds to the sensed conditions 6, and controls the operation of the load. Contact 42 provides a safety interlock for this circuit.

In operation, the microprocessor 10 receives an input request to supply heat by initiating a burner cycle. At this time the safety relay circuit is not being driven and contact 42 is open. Proper operation of this relay is verified by receiving the sensed conditions 6 which indicate the status of the load 45. Several burner cycle functions such as purging of the combustion chamber are performed before the fuel valve is activated. The microprocessor 10 begins running internal tests of its functions and generating a keyword which represents their operational status. At the appropriate time, the safety relay contacts 42 and load contacts 43 close to provide power to the load 45. Each test will generate either a "1" or a "0" to signify the normal operation of the function. These outputs can then be combined to create a unique keyword for the microprocessor. A keyword which indicates the desired operation of all the functions is a "valid" keyword. Each function or functions is assigned a particular position in the keyword into which to place its bit. After the keyword is created, the select output 12 then signals the keyword decoder to begin receiving the keyword. At timed intervals controlled by the clock 16, the bits in the keyword are output from the microprocessor through data signal 14.

The keyword is generated repetitively by the microprocessor 10 at a predetermined frequency. On alternate generations of the keyword, a program within the microprocessor chooses a bit position within the keyword and inverts the logic of one bit from a "1" to a "0", or vice versa. This creates an "invalid" keyword because the keyword contains a logic bit other than one which represents the desired operation of a function in the microprocessor. An example of this procedure is illustrated in FIG. 2. FIGS. 2a-d show four consecutive keywords which have been generated by the microprocessor. The first keyword generated, as seen in FIG. 2a, is a valid keyword. FIG. 2b shows the next keyword generated, and it is an invalid keyword because of the inverted bit in position b0. The microprocessor then generates a valid keyword which can be seen in FIG. 2c. The keyword in FIG. 2d is again invalid, but the inverted bit has been rotated to position b1. This alternating process continues as long as the microprocessor is operating, and the position of the bit that is to be replaced is changed so that each bit path in the keyword decoder is eventually tested. It is not important in what order the positions are chosen, only that bits in all the positions of the keyword are inverted regularly. For example, the 8 bits could rotate through the bit checking program one out of every eight checks.

The keywords are received through the data signal 14 in the keyword decoder 20, and are stored in the shift register 22. After all the bits from the keyword are stored, a clock signal 16 is received by the shift register 22 and all the bits in the keyword are then transmitted simultaneously over the bit paths 27a-h to the AND gate 26. In FIG. 1 it can be seen that the bits in positions b1, b3, and b7 will encounter inverters 23, 24, and 25. The positioning of the inverters is completely dependent on the valid keyword output by the microprocessor. The AND gate 26 outputs a "true" signal when a valid keyword is received and it outputs a "false" signal when an invalid keyword is received. The "true" or "false" signals that are output from the AND gate are held in the latch 29 until a signal is received from the timer output 18. Once this signal is received, either a "true" or "false" signal is output over the conductor 32 to the microprocessor 10 and the dynamic safety relay drive circuit 40.

If the microprocessor is operating as desired, the AND gate 26 will output a high and low signal in an alternating fashion. This will cause the latch 29 to output a square wave of a particular frequency. The square wave is transmitted through the conductor 32 to the microprocessor and the dynamic safety relay drive circuit 40. The coil in the dynamic safety relay drive circuit will continue to be energized as long as the signal continues to be a square wave of a particular frequency. This will keep contact 42 closed. The conductor 32 also conducts the square wave from the latch to the microprocessor, and if the square wave flattens out or changes frequency, the microprocessor will send a signal along conductor 44 to open load contact 43 and cut power to the load 45.

If one of the microprocessor functions is not operating as desired, an invalid bit will be positioned in the keyword and the keyword decoder will output a false signal. This error in the microprocessor will cause the keyword decoder 20 to output consecutive "false" signals which will cut power to the load. Ideally, any microprocessor error evidenced by an invalid keyword should be detected by this system, but it is possible that a keyword decoder malfunction could occur which would cause a microprocessor error to go undetected.

A keyword decoder may malfunction so that an inverter continually outputs one signal regardless of the signal which is input. Essentially, the inverter becomes stuck. An inverter may stick so that it always outputs a signal which indicates the desired operation of a microprocessor function which transmits over the bit path. If an error occurs in that particular microprocessor function, the output from the inverter will not change to show an error condition, and the system will continue operating with faulty hardware. The prior art offers no solution for this type of malfunction.

In the present invention, if the bit which indicates an error condition is sent down a bit path with a stuck inverter, the signal output from the inverter will indicate a no error condition. As the microprocessor continues to operate, the inverted bit will still rotate through the keyword on alternate generations, and when it comes to the malfunctioning bit path it will also pass through the system undetected. Since neither the error bit or the inverted bit have been detected by the system, the decoder has now output two consecutive "true" signals which will disrupt the square wave and cause the dynamic safety relay drive circuit 40 to de-energize. Once it is determined that the keyword decoder has malfunctioned, it can then be replaced.

Figure 3:
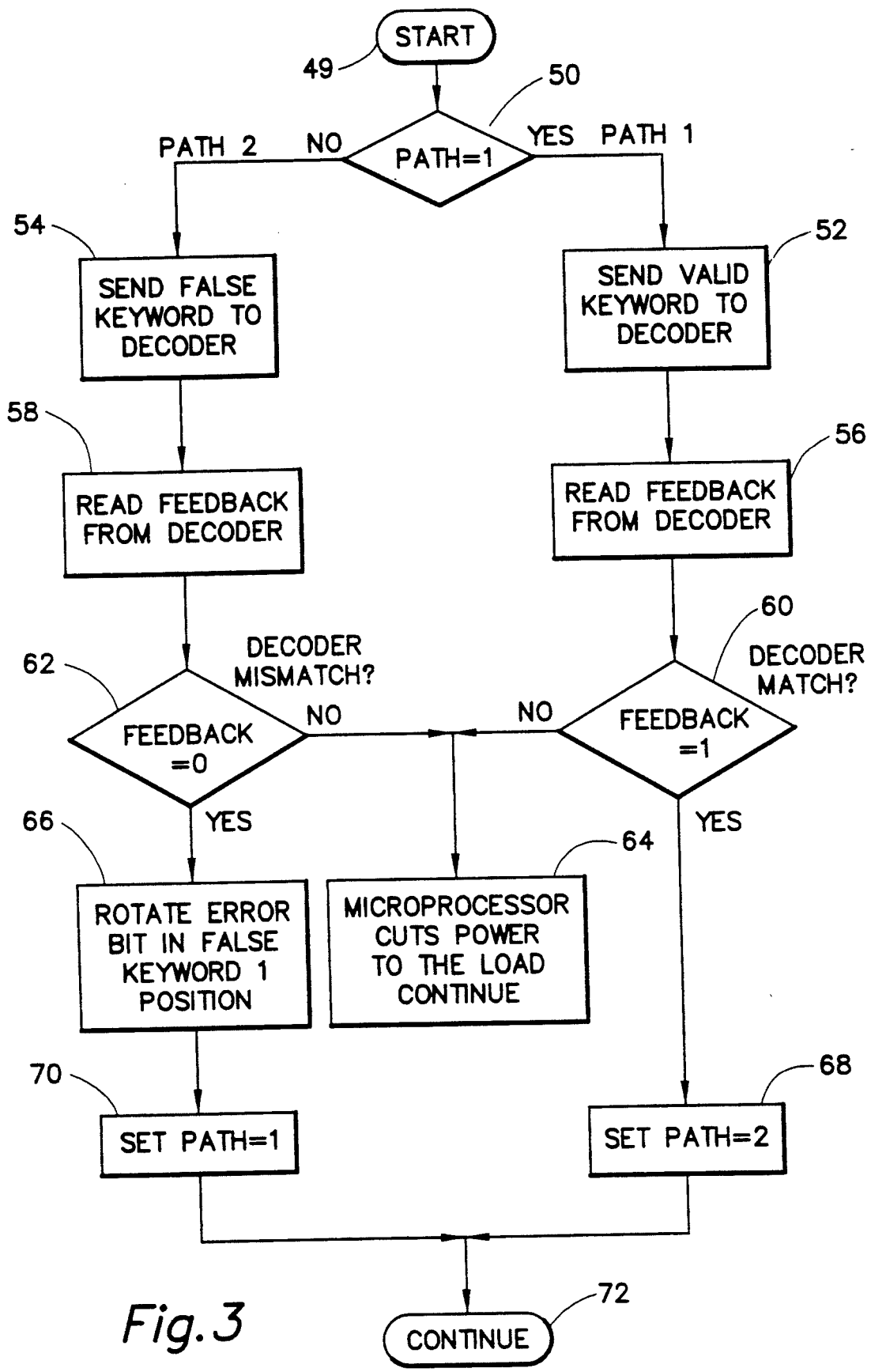
FIG. 3 illustrates a flow chart of the operation of the continuous checking means.

The operational logic of the dynamic self-checking safety circuit means is illustrated by the flow chart in FIG. 3. As described above, valid and invalid keywords are sent on an alternate basis. As illustrated by the flow chart, the microprocessor follows path 1 or path 2 alternately. Path 1 signifies when a valid keyword will be generated, and path 2 indicates when an invalid keyword will be generated. First the monitoring process is begun in step 49 and then the microprocessor must determine in step 50 if path 1 or 2 is to be followed. If it is path 1, a valid keyword is generated in step 52 and sent to the decoder. The keyword is then checked in step 56, and if the valid keyword is indeed detected, a "true" signal is output. If an invalid keyword is detected, a "false" signal is output. At step 60 the output of the keyword decoder is checked and if it is "true", the path is set to "2" at step 68. The cycle is then continued at step 72. However, if the output signal is "false" at 60, the microprocessor will output a signal to cut power to the load. If the path is "2" at step 50, the microprocessor will send an invalid keyword to the keyword decoder at step 54. The keyword will be read at step 58, and if it is an invalid keyword, a "false" signal will be output. The output signal is checked at step 62, and if the signal is indeed "false", the error bit is rotated to a new position in the keyword at step 66 and the path is set back to "1" at step 70. The process is then started again at step 72. However, if a valid keyword is detected at step 62, the microprocessor will be output a signal to cut power to the load.

The foregoing has been a description of a novel and non-obvious dynamic self-checking safety circuit which includes error detection in the keyword decoder. The applicant does not intend to limit the invention by the foregoing description, but instead define the invention through the claims appended hereto.

We claim:

1. A dynamic self-checking safety circuit means comprising:

a microprocessor programmed to periodically generate a predetermined sequence of logic bits, wherein on alternate generations of the predetermined sequence of logic bits a single bit is inverted in a particular position in the predetermined sequence of logic bits and the position of the bit which is inverted is rotated through the predetermined sequence of logic bits so as to include all possible bit positions;

decoder means connected to the microprocessor for outputting a first unique signal in response to receiving the predetermined sequence of logic bits, and outputting a second unique signal in response to receiving any sequence of logic bits other than the predetermined sequence bit of logic bits; and safety relay drive means which allows operation of a load only when the first and second unique signals are output from the decoder means alternately and at a predetermined frequency.

2. The dynamic self-checking circuit means of claim 1 wherein said decoder means includes a shift register, an AND gate, and a latch.

3. The dynamic self-checking safety circuit means of claim 1 wherein said safety relay drive means regulates electric power to said load.

4. The dynamic self-checking safety circuit means of claim 1 wherein said load is a fuel valve for a a fuel burner.

5. The dynamic self-checking safety circuit means of claim 1 wherein said predetermined sequence of logic bits is indicative of the operational status of the microprocessor.

6. The dynamic self-checking safety circuit means of claim 5 wherein each bit in said predetermined sequence of logic bits is indicative of the operating status of a particular function of the microprocessor.

7. A method of providing safe operation of a microprocessor comprising the steps of:
  generating a predetermined sequence of logic bits periodically, wherein one bit in a particular position in the predetermined sequence of logic bits is inverted on alternate generations of the predetermined sequence of logic bits and the position of the bit which has been inverted is rotated through the predetermined sequence of logic bits so as to include all possible bit positions;
  outputting a first unique signal in response to receiving the predetermined sequence of logic bits, and outputting a second unique signal in response to receiving any sequence of logic bits other than the predetermined sequence of logic bits; and
  allowing operation of a load only when the first and second unique signals are output alternately and at a predetermined frequency.

8. The method of claim 7 wherein the step of generating the predetermined sequence of logic bits is done repetitively and at a predetermined frequency.

9. A dynamic self-checking safety circuit means having a microprocessor which repetitively generates a predetermined sequence of logic bits, a decoder means connected to the microprocessor for outputting a first signal when the decoder receives the predetermined sequence of logic bits and for outputting a second signal when the decoder means receives anything but the predetermined sequence of logic bits, and a switch means for allowing operation of a load when the first and second unique signals are output from the decoder means alternately and a predetermined frequency, wherein the improvement comprises:
  said microprocessor is programmed to invert one bit in a particular position in said predetermined sequence of logic bits on alternate generations of said predetermined sequence of logic bits wherein the position of the inverted bit is rotated through the predetermined sequence of logic bits so as to include all possible bit positions.

10. The dynamic self-checking safety circuit means of claim 9 wherein said decoder means includes a shift register, an AND gate, and a latch.

11. The dynamic self-checking safety circuit means of claim 9 wherein said safety relay drive means regulates electric power to a load.

12. The dynamic self-checking safety circuit means of claim 9 wherein said load is a fuel valve for a fuel burner.

13. The dynamic self-checking safety circuit means of claim 9 wherein said predetermined sequence of logic bits is indicative of the operational status of the microprocessor.

14. The dynamic self-checking safety circuit means of claim 9 wherein each bit in said predetermined sequence of logic bits is indicative of the operating status of a particular component of the microprocessor.

* * * * *